(12) United States Patent
Buettner et al.

(10) Patent No.: US 11,153,468 B2
(45) Date of Patent: Oct. 19, 2021

(54) IMAGE PROCESSING METHOD AND SYSTEM

(71) Applicant: Blackmagic Design Pty Ltd, Port Melbourne (AU)

(72) Inventors: Carsten Buettner, Port Melbourne (AU); Rowan Douglas Habel, Port Melbourne (AU)

(73) Assignee: Blackmagic Design Pty Ltd, Port Melbourne (AU)

( * ) Notice: Subject to any disclaimer, the term of this patent is extended or adjusted under 35 U.S.C. 154(b) by 0 days.

(21) Appl. No.: 16/570,162

(22) Filed: Sep. 13, 2019

(65) Prior Publication Data
US 2020/0092446 A1 Mar. 19, 2020

(30) Foreign Application Priority Data

Sep. 13, 2018 (AU) .................................. 2018903448

(51) Int. Cl.
*H04N 5/217* (2011.01)
(52) U.S. Cl.
CPC .................................. *H04N 5/2176* (2013.01)
(58) Field of Classification Search
CPC .... H04N 5/2176; H04N 19/625; H04N 19/60; H04N 19/48; H04N 5/361; H04N 5/357; H04N 5/217; H04N 5/23229; G06T 9/007
See application file for complete search history.

(56) References Cited

U.S. PATENT DOCUMENTS

| | | | | |
|---|---|---|---|---|
| 2005/0083545 A1* | 4/2005 | Takata | ................... | H04N 19/90 |
| | | | | 358/1.9 |
| 2011/0102647 A1* | 5/2011 | Kim | ....................... | H04N 5/365 |
| | | | | 348/243 |
| 2019/0313124 A1* | 10/2019 | Stepin | .................. | H04N 19/154 |

FOREIGN PATENT DOCUMENTS

| | | |
|---|---|---|
| EP | 1 102 209 A2 | 5/2001 |
| WO | 2014/144443 A2 | 9/2014 |

OTHER PUBLICATIONS

Foi et al., "Practical Poissonian-Gaussian Noise Modeling and Fitting for Single-Image Raw-Data", IEEE Transactions on Image Processing, vol. 17, No. 10, Oct. 1, 2008, pp. 1737-1754.
Extended European Search Report for Application No. 19191126.2 dated Jan. 28, 2020, 10 pgs.

* cited by examiner

*Primary Examiner* — Twyler L Haskins
*Assistant Examiner* — Fayez A Bhuiyan
(74) *Attorney, Agent, or Firm* — Seed IP Law Group LLP (57) ABSTRACT

A method of processing image data that is represented in a frequency domain includes the step of applying a noise signal to the image data to yield noise-applied image data. In at least one embodiment, the image data includes one or more sets of coefficients arising from application of a discrete cosine transform, each set of coefficients comprising a DC coefficient and one or more AC coefficients. The noise signal is applied to the image data by modifying one or more of the coefficients in one or more of the sets. The modifying includes replacing one or more of the AC coefficients with random or pseudo random numbers having a distribution. Noise present in the image data may be equalized, prior to the step of applying the noise signal.

27 Claims, 9 Drawing Sheets

IMAGE PROCESSING METHOD AND SYSTEM

BACKGROUND

Technical Field

The present disclosure relates to methods and systems for processing image data. More specifically, the present disclosure relates to methods and systems for compression of image data that includes noise and its decompression.

Description of the Related Art

Digital color cameras capture color images of real-life scenes electronically using an image sensor, usually a charge-coupled device (CCD) or a complementary metal oxide semiconductor sensor (CMOS). The data comprising the image is often processed in the camera and encoded, either for internal storage on the camera or for transmission from the camera for storage on external media and/or downstream processing.

Digital image capture involves a process of opto-electronic conversion which introduces noise into the image data. Because noise is included in an image almost from the moment of its creation, the noise necessarily undergoes the same image processing and encoding routines as the non-noise component of the image. For encoding techniques that involve discrete cosine transformations (DCT) (and especially those operating at higher compression ratios), higher frequency image components tend to be removed, which manifests as block-type structures in the encoded image. Noise components removed through DCT encoding can impart a 'plastic' appearance to surfaces depicted in the encoded image. Consequently, images areas that are low in structural detail may appear to look 'unnatural' due to these removed higher frequencies and distorted spatial noise characteristics.

There are myriad techniques for dealing with the inevitable noise that is present in a typical image. These include signal processing approaches, as well as various categories of filtering—such as deblocking filters applied after the image is decoded, which aim to attenuate certain compression artifacts. Such filtering generally attempts to reduce the visibility of block-type artifacts.

The present disclosure aims to provide an approach to dealing with such compression artifacts.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY

According to a first aspect of the present disclosure, there is provided a method of processing image data represented in a frequency domain, the method including the step of applying a noise signal to the image data to yield noise-applied image data.

The present disclosure takes what may be seen as a counterintuitive approach to image processing by applying a noise signal to an image rather than attempting to attenuate or wholly remove the noise.

The disclosure arises from observations that certain components and intensities of image noise can actually be experienced by a viewer as a perceptually pleasant or more realistic attribute of the image being viewed. This is especially so when it is a moving image being viewed. More specifically, image noise that is dominated by particular distributions of photon shot noise can be experienced by viewers as being perceptually pleasant. As some of this perceptually pleasant image noise is typically being lost or distorted in the compression process, the disclosure aims to reproduce certain spatial and temporal noise distributions so they are better represented in the decoded image.

Typically, the image data represented in the frequency domain includes one or more sets of coefficients arising from application of a discrete cosine transform, with each set of coefficients comprising a DC coefficient and one or more AC coefficients. According to this embodiment, the noise signal can be applied to the image data by modifying one or more of the coefficients in one or more of the sets.

Such modification may in some cases comprise replacing one or more of the AC coefficients with pseudo random numbers having a distribution. According to this embodiment, the replaced AC coefficients can be those having zero value.

According to preferred embodiments, the method further includes the step of equalizing noise present in the image data, the equalizing step being performed prior to the step of applying the noise signal. In this embodiment, the equalizing step is performed on an uncompressed, spatial representation of the image data. Typically, the equalizing step includes equalizing the noise such that its amplitude or standard deviation is substantially constant across the entirety of the image data.

The noise may be equalized by reference to a noise model, which can be a model of the opto-electronic conversion performed by the specific image sensors that were used to capture the image data. For example, the noise model may characterize noise by reference to its spatio-temporal distribution within the image data. The noise model may also account for photon shot noise and/or read noise associated with the opto-electronic conversion.

According to some embodiments, the noise model substantially follows a normal distribution.

According to some embodiments, the noise signal applied to the image data is scaled by reference to the noise model.

Optionally, the method includes the steps of applying an inverse quantization to the image file prior to application of the noise signal, as well as entropy-decoding the compressed image.

The method may also include the step of applying an inverse discrete cosine transform.

According to another aspect, the present disclosure provides a method for processing an image signal obtained from an image sensor, the image signal having a noise component with an amplitude and an image component with an amplitude, the method including:
  determining a conversion function from characteristics of the image sensor; and
  applying the conversion function to the image signal to yield a signal with a noise component of substantially constant amplitude independent of the amplitude of the image component.

The "amplitude" of the noise component does not refer to noise component's value, but rather to the amplitude of a statistical measure of the noise component.

The method may further include the step of converting the image data into a frequency domain representation. According to some embodiments, the conversion comprises applying a discrete cosine transform to the image data.

The method may further including the step of quantizing the converted image data, as well as entropy encoding the quantized image file.

BRIEF DESCRIPTION OF THE SEVERAL VIEWS OF THE DRAWINGS

An embodiment of the disclosure will now be described with reference to the accompanying drawings, in which.

DETAILED DESCRIPTION

Embodiments of the present disclosure will now be described with reference to specific examples, but the scope of the disclosure should not be considered as being limited to such examples.

Figure 1:
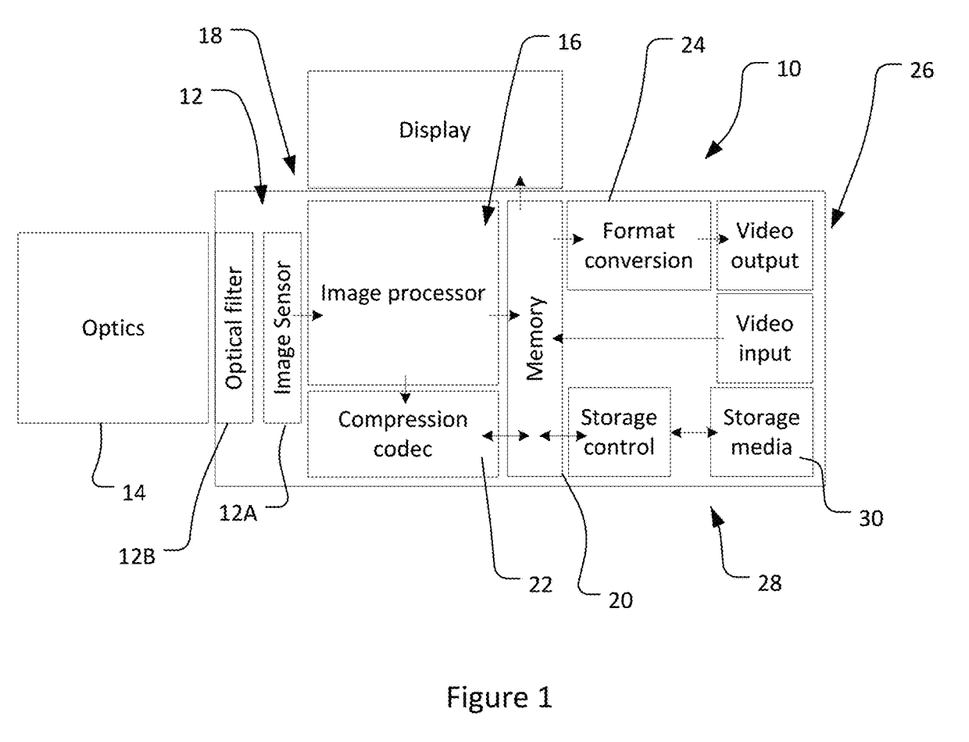
FIG. 1 is a schematic illustration of a digital camera.

FIG. 1 is a schematic representation of a camera 10 capable of implementing methods according to the present disclosure. The camera 10 includes an image capture system 12 configured to convert received light into image data. In this example, the image capture system 12 includes an image sensor 12A (e.g., a CCD or CMOS image sensing chip or similar) and associated optical filter 12B (e.g., an IR cut-off filter or an optical low pass filter). An optical system 14, e.g., a lens is also provided to form images on the image sensor. The image sensor includes a color filter array (CFA), in the form of a spatial array of color filters, placed in front of the image sensor chip to enable capture of color images. The filters of the CFA are spatially correlated with photosites of the single image sensor, so that each photosite has a corresponding spectrally selective filter. In this example, the CFA used is a Bayer CFA with alternating red, green and blue color filters, although the techniques of the present disclosure are not limited to use with any specific CFA.

The video data that is generated by the image capture system 12 is passed to the image processing subsystem 18. The image processing subsystem 18 may comprise one or more data processors, such as an ASIC or FPGA or microprocessor with associated software, and is configured to perform a range of image processing tasks. Working memory 20 is provided to enable temporary storage of data or software or the like during image processing and other tasks.

The image processing subsystem 18 also includes a video encoding system 22. The video encoding system 22 will typically be implemented by providing software configured to enable a processor to implement one or more video codecs. This system can be used to encode and compress the video data into a desired format as well as executing the video processing methods in accordance with the current disclosure. The disclosed methods can also be executed on processing platforms separate from the camera, such as dedicated external video recorders and general purpose computer systems.

The image processing subsystem 18 may also include a format conversion system 24 which processes video output data into a format (such as Y'CbCr) that is better able to be transmitted over a video transmission system 26 or that is more convenient for downstream processing. The format conversion system 24 is provided to format the video data into one of said video transmission formats to enable transmission, before being passed to the video transmission system 26. This can include transcoding video data from its original format into (one of) an appropriate video transmission format of the video transmission system 26.

The video transmission system is operable to transmit (and optionally receive) video output data (such as to an external video recorder or recorder/monitor) via a video interface having at least a video output port. The video interface can be bi-directional and thus also include a video input port. As an example, the video interface could be an SDI interface or other like interface.

The camera also includes a data storage system in the form of a memory control subsystem 28 which is configured to control persistent storage of video data (and any other data) on a local non-volatile memory 30. The local memory 30 may use a removable memory such as a memory card or removable hard drive. However, in the general case, the memory control subsystem 28 is arranged to transmit and/or receive control signals to/from the local memory 30 to control storage and retrieval of video data on the memory 30 and also to perform any encoding or formatting of data for storage. The memory 30 could be a solid state drive operating according to the Serial ATA protocol, in which case the memory control subsystem will operate to control operation of the SATA drive and manage reading and writing of data to it.

Figure 2:
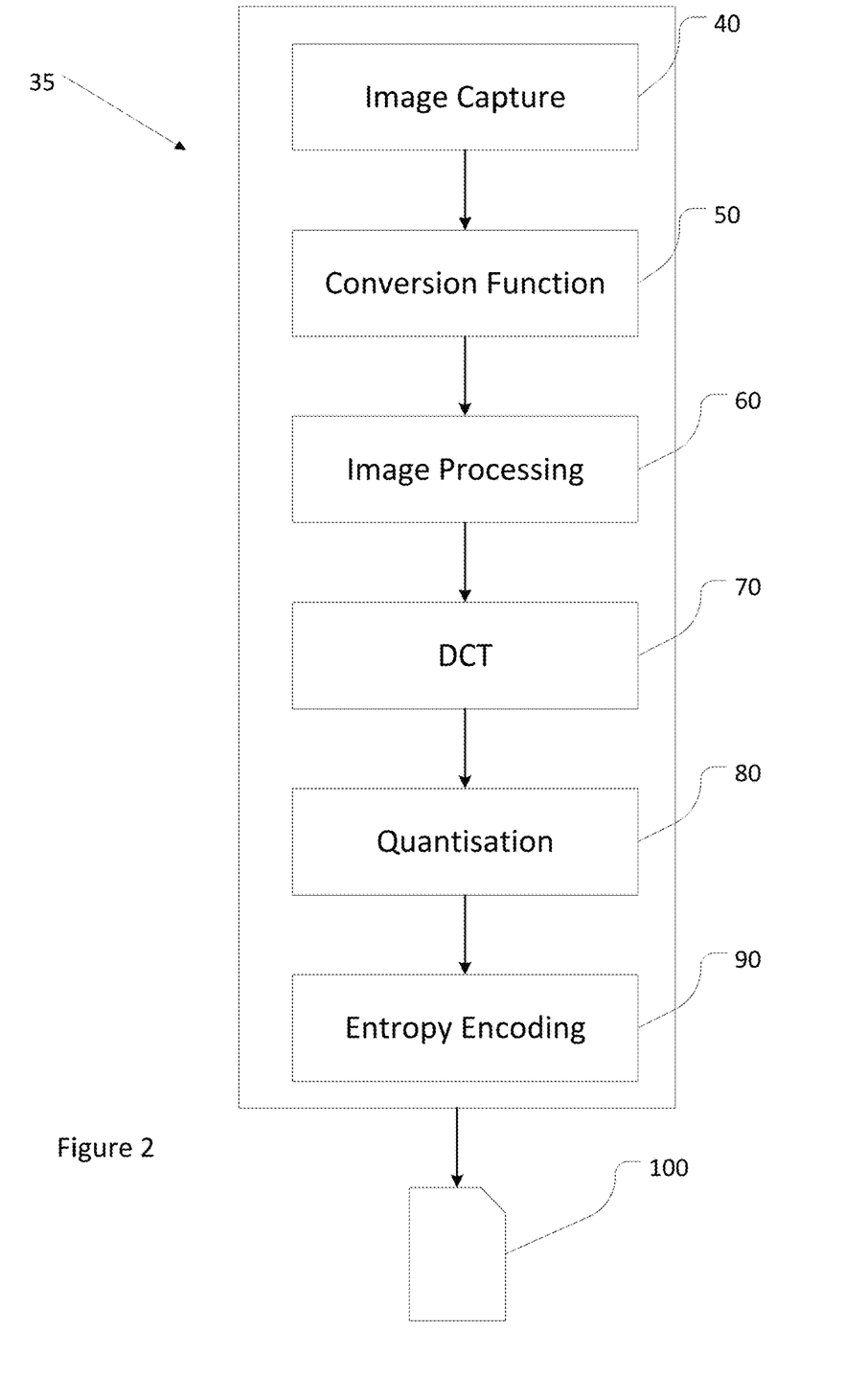
FIG. 2 is a flow chart of the encoding phase of a method in accordance with an embodiment of the present invention.

The encoding phase 35 of the method according to an embodiment of the current disclosure is illustrated by the flowchart of FIG. 2. The method commences at step 40 with the capturing of an image. As noted above, digital image capture involves the conversion of light received at image sensor 12A first into an electric charge, followed by a voltage, and then finally into digital numbers (DN). The meaning of the DNs is dependent on the particular image representation format being used, and the techniques of the present disclosure are not limited to any particular format. For example, each pixel in an image in RGB format comprises a vector of three DNs; one for each of three color channels (being red, green and blue), with the entire image comprising a two dimensional array of pixels. The two dimensional pixel array can also be analyzed from the perspective of being a digital image signal.

The present disclosure can equally be performed on raw image data that has not undergone demosaicing, as well as on image data that includes 4 or more spectral bands.

Subsequent to image capture, a conversion function (step 50) is applied to each pixel comprising the image signal. In this regard, it is a fact that the process of opto-electronic conversion inevitably introduces noise into image signals during their construction. This introduced noise is generated from both the opto-electronic and electronic componentry of the image capture system 12, and because noise begins to be introduced to an image signal from the moment of its creation, the noise component undergoes the same image processing routines as the image component of the signal.

However, the inventors have discerned that certain components and intensities of image noise can actually be experienced by a viewer as a perceptually pleasant, or more realistic attribute of the image being viewed.

In particular, the inventors have discerned that image noise which is dominated by particular distributions of photon shot noise can be experienced by viewers as a perceptually pleasant attribute. Photon shot noise arises from the fundamental physical processes governing the behavior of discrete quantum particles and their interaction with image sensors. As noted above, the array of photosites on image sensor 12A produces a signal in proportion to the amount of incident light striking each photosite during a defined time period (or 'integration time'). However, even with constant illumination and integration time, the signal captured by the image sensor always subtly varies from one capture to another, producing the phenomenon of photon shot nose.

The random statistical fluctuations that characterize photon shot noise can be modelled as a Poisson process, with the standard deviation thereof (s_e) being described by the formula:

$$s\_e = \mathrm{sqrt}(N\_e),$$

with N_e being the number of electrons generated in the pixel's photodiode.

This Poisson process can also be described as a normal distribution.

Another important temporal noise component is the noise floor, also known as the 'read noise' or 's_r' of the image sensor 12A. The noise floor usually incorporates a combination of individual noise sources including optical and electronic components such as amplifiers and ADCs. The noise floor can also be modelled as a normal distribution that is constant for specific componentry settings, such as a fixed amplifier gain. The noise floor is also independent of the integration time and of the amount of light received at the image sensor.

Modelling these temporal noise sources leads to a total noise of:

$$s\_total = \mathrm{sqrt}(s\_r^2 + s\_e^2).$$

This quantity can be transferred into the digital domain by a system conversion factor.

Knowing the noise model for a specific image sensor and its settings allows the conversion function to be computed and applied to the image sensor's usually linear signal output in a way that the standard deviation of the temporal noise is substantially constant across a spectrum of signal levels.

This converted signal is described herein as a 'noise equalized response'.

As described below, using this concept of noise-equalized response also allows noise having a substantially constant distribution to be added to an image area—or indeed to the whole image—independent of the local brightness.

Subsequent to conversion, typical image processing can be performed (step 60) on the noise-equalized response signal, such as demosaicing, application of filter kernels, and/or transformation into other color spaces (such as YCbCr). Such processing may necessarily have the effect of changing the noise distribution.

Following image processing, the noise equalized response signal is encoded (step 70) using a discrete cosine transform (DCT). Such encoding involves splitting the image data array into suitable sized blocks (such as 8×8) and converting each block to a frequency-domain representation, using a DCT. Before computing the DCT of each block, its values (that incorporate the noise-equalized response) may be shifted to ensure a range centered on zero. A two-dimensional DCT is then taken of the block. This yields a block having a top-left corner entry (or DC coefficient) that is often of relatively larger magnitude that defines the block's basic intensity level. The remaining coefficients are known as the AC coefficients.

DCT encoding in this way allows the noise distribution to be analyzed in the DCT (namely frequency) domain. In addition (and as described below), as the amplitude of the noise signal is known and (at least in some cases) substantially constant, each DCT block can be individually analyzed during a decoding operation at a time after inverse quantization has been performed. This allows a noise distribution to be regenerated in the frequency domain that closely matches (in the sense of being perceptually similar) the distribution that was present in the signal before undergoing quantization and other rounding performed during encoding.

Furthermore, knowing the standard deviation of the noise embedded in the noise-equalized response allows data storage for certain image areas having more constant brightness, to be limited to a DC offset and thus minimized. The spatial and temporal noise for these areas can be readily regenerated and added to the signal at a later time. In this regard, details of the noise distribution can be stored as metadata in selected frame headers or in other parts of the image data including tiles, slices or at block level. This allows a decoder (discussed below) to apply an appropriate noise signal for each specific frame.

The DCT blocks are next quantized (step 80) by reference to a suitable quantization matrix. Quantization yields DCT blocks with coefficient values that are smaller in magnitude than the input. Input frequency coefficients that are sufficiently small (low magnitude) with respect to a given degree of quantization will be compressed down to zero. When this occurs, any noise component present in the signal at such coefficients is completely removed.

Following quantization, the DCT blocks are further compressed, this time losslessly, through a process of entropy encoding (step 90). This involves the application of a run-length encoding algorithm to the frequency data, and a Huffman-type encoding of the resultant data. This yields an encoded compressed image which can be written into an encoded image file 100.

Figure 2A:
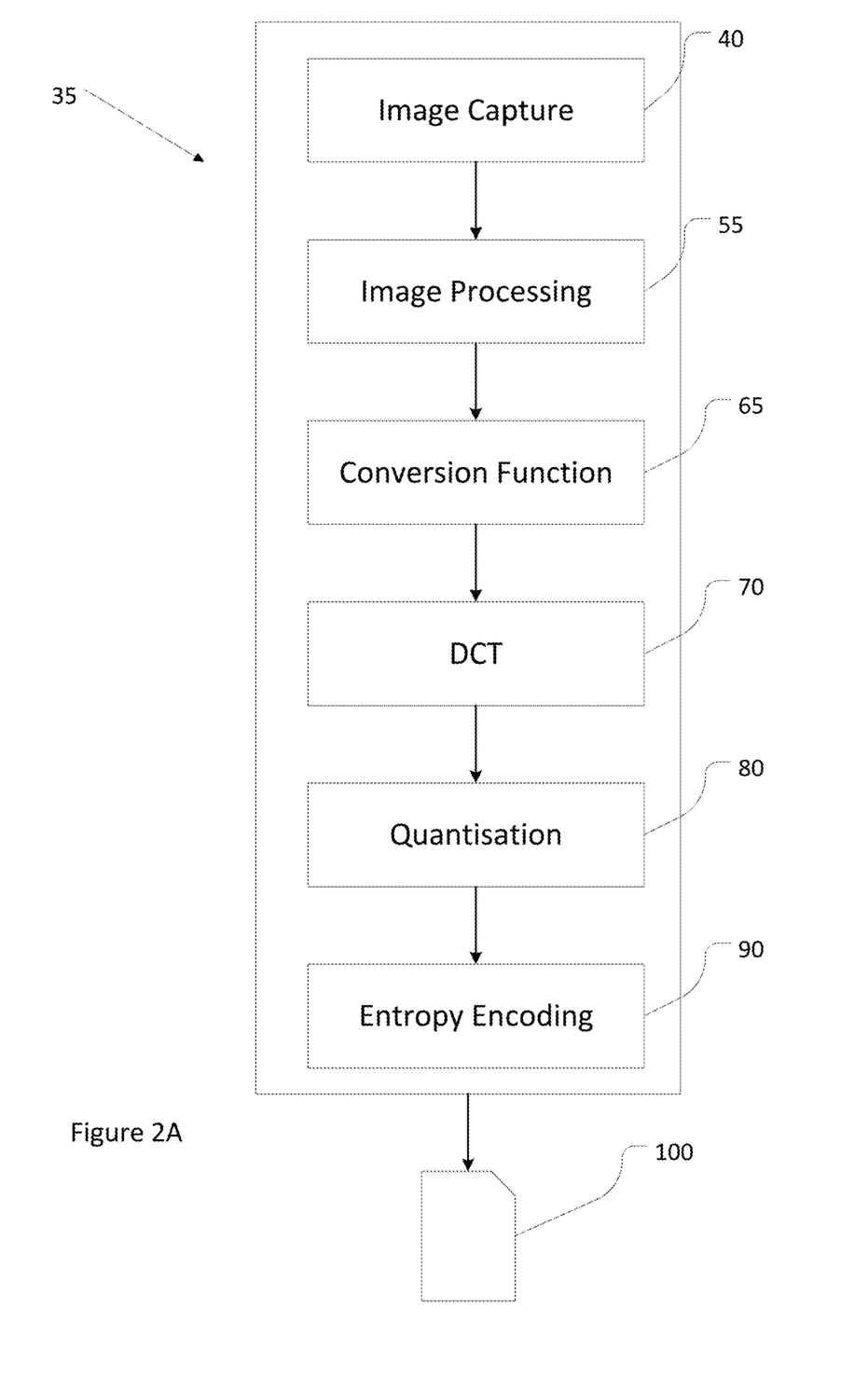
FIG. 2A is a flow chart of an alternative encoding phase of a method in accordance with an embodiment of the present invention.

An alternative encoding phase is illustrated by reference to the flowchart in FIG. 2A. The illustrated encoding methodology is as per FIG. 2, but with the conversion function (step 65 in FIG. 2A) being applied to image data that has already undergone processing (step 55 in FIG. 2A). The image processing performed in step 55 is equivalent to that performed in step 60, namely demosaicing, application of filter kernels, and/or transformation into other color spaces (such as YCbCr).

Figure 3:
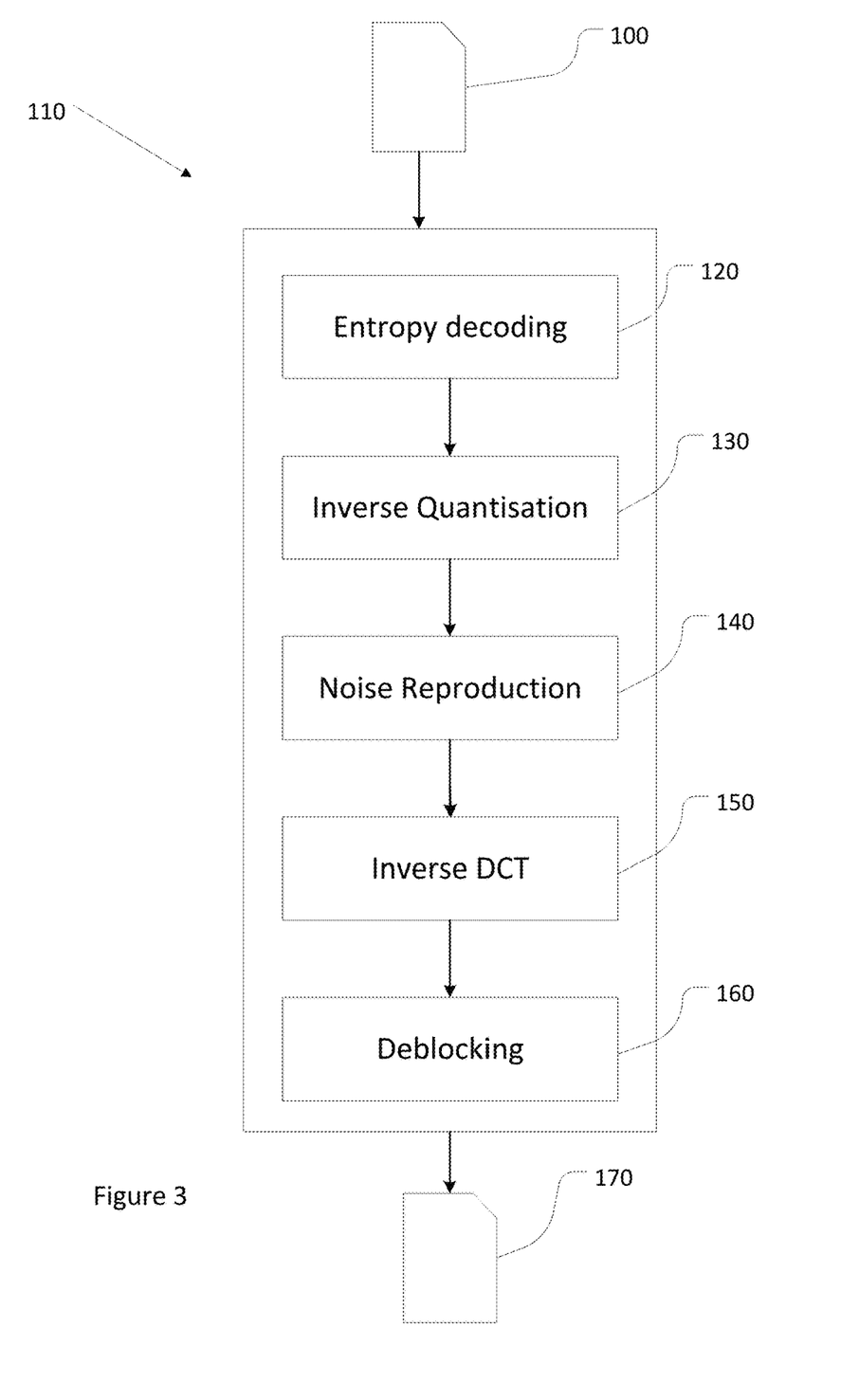
FIG. 3 is a flow chart of the decoding phase of a method in accordance with an embodiment of the present invention.

The decoding phase 110 of the method according to the current disclosure is illustrated by the flowchart of FIG. 3. The decoding phase 110 is used to play back previously recorded image data, which can occur on camera hardware or on a separate processor as part of a video player or editing system.

Method 110 is performed on the encoded image file 100 generated by performing method 35. Performing method 110 first involves entropy-decoding (step 120) of encoded image file 100. Entropy decoding involves perfectly reversing the entropy encoding (step 90) of the encoding phase 35 to yield a collection of DCT blocks, each comprising a matrix of quantized DCT coefficients.

Inverse quantization (step 130) is then performed on each block of quantized DCT coefficients. Inverse quantization involves reversing, as far as is possible, the quantization step (step 80) of the encoding phase 35. It is performed with reference to the same quantization matrix selected for use in quantization (step 80). The de-quantized DCT blocks thus produced, closely (but not exactly) resemble the original DCT coefficient matrix—namely that produced during the DCT step (step 70). In turn, the DCT coefficient matrix is a representation of the original image file in the frequency domain.

The imperfect reproduction achieved from de-quantizing a quantized DCT block is largely responsible for the appearance of compression-related artifacts seen in a fully decoded image or sequence of images. These artifacts are due to the original frequency coefficients being rounded to a smaller number of quantized levels, including to zero. After inverse quantization, any coefficient with a value of zero had potentially originally been a small noise or signal component that was removed. While the precise original values of the noise components can never be recovered, knowledge of the noise's random distribution allows generation of new random or pseudo-random data values that follow that distribution (or an approximation thereof).

In this regard, noise reproduction is performed (step 140) on each DCT coefficient matrix output from the inverse quantization step. Noise reproduction involves modifying the AC coefficients of each DCT block. A preferred modification involves substituting normally distributed random or pseudo-random numbers for any AC coefficients of the DCT coefficient matrix having a zero value. The pseudo random number generator can have reference to a seed value present in the header of each frame. This is to ensure consistency in the reproduced noise signal across each frame irrespective of how and when the frame is decoded.

Noise reproduction has the result of encoding a normal noise distribution into the DCT coefficient matrix, thereby subtly modifying one or more of its components.

In some cases, this is achieved in such a way that the noise characteristics of the fully decoded image after inverse DCT (and after other optional operations) appear to be the same as the noise present in the original image before encoding.

As the original noise component of the signal has a random distribution both temporally and spatially, a new random distribution can be created that may not have exactly the same values in each specific block as existed before quantization. However, as the noise signals share the same statistical distribution, an exact reproduction of coefficient values is not required.

After noise reproduction, the DCT coefficient matrix (now including the modified coefficients modulating the desired noise signal) undergoes Inverse DCT (step 150). The process proceeds by initially taking the two-dimensional inverse DCT of the matrix, rounding the results to integer values, and shifting the integer values to restore the original data range.

Subsequent to Inverse DCT, optional deblocking processes (step 160) can be performed on the resulting matrix such as to account for non-white-noise distributions where higher frequencies are attenuated in comparison to lower frequency noise components. Other optional processes include inverse conversion from any applied noise-equalized response, color processing, or other image processing.

A decoded image 170 is produced from performing the method 110.

The following discussion is an example of performing the methods described above on a typical image with typical noise characteristics, in which:

N_e—is the number of electrons generated in a pixel's photodiode;

s_e—is the standard deviation of the photon shot noise component of the temporal noise (using the unit: electrons);

s_r—is the standard deviation of the noise floor (or the "read noise") component of the temporal noise (using the unit: electrons); and s_total—is the total noise standard deviation (using the unit: electrons).

As noted above, most of the signal range is ideally dominated by photon shot noise which is modelled as a Poisson process, and the standard deviation s_e can be described by:

$$s\_e=\mathrm{sqrt}(N\_e);$$

Modelling only these two temporal noise sources leads to a total noise (summed in quadrature) of $$s\_total = \mathrm{sqrt}(s\_r{\wedge}2 + s\_e{\wedge}2) = \mathrm{sqrt}(s\_r{\wedge}2 + N\_e)$$

The maximum value taken by this model occurs when N_e is maximal. This represents the number of electrons generated in a photodiode that is saturated with light—namely the "full well capacity" of the photodiode. In the discussion below:

fwc—is the Full Well Capacity (electrons); and s_max—is the Maximum standard deviation of the total noise $$s\_\max=\mathrm{sqrt}(s\_r{\char`\^}2+fwc).$$

Typical example values of these quantities for an image sensor are:

$$s\_r=3;$$

$$fwc=30000;\text{ and}$$

$$s\_\max=\mathrm{sqrt}(3{\char`\^}2+30000)=173.23.$$

Figure 4:
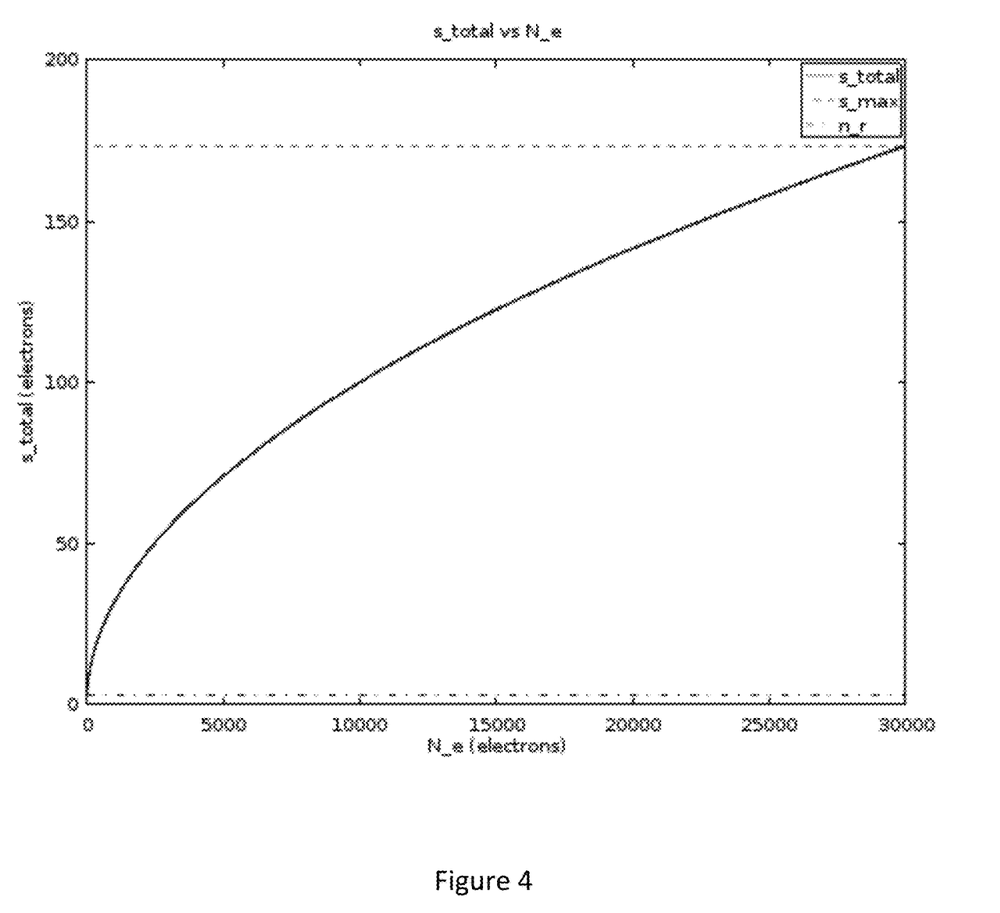
FIG. 4 is an example plot that depicts a representative relationship between certain image capture parameters.

The graph shown in FIG. 4 depicts the representative relationship between N_e and s_total.

This can be transferred into the digital domain by a system conversion factor, which is a linear scaling from units of electrons to units of digital-numbers (DN).

The system conversion factor is in units of DN per electron, with:

dn_max—being the DN value to which full well capacity is mapped;

dn_off—being the DN "offset" value to which a zero electrons (black) input signal is mapped (note: this is not the mapping of the read_noise level); and A_cf—being the Conversion Factor (DN/e-).

dn_off is typically set as a pedestal level greater than zero in order to avoid clamping the read-noise that is present even in a zero electron input scenario.

Example values for a camera's image acquisition are:

$$dn\_\max = 65535;$$

$$dn\_\min,\ dn\_off = 160;\text{ and}$$

A_cf = (dn_max − dn_off) / fwc = (65375)/30000 = 2.179 (3 d.p.).

Figure 5:
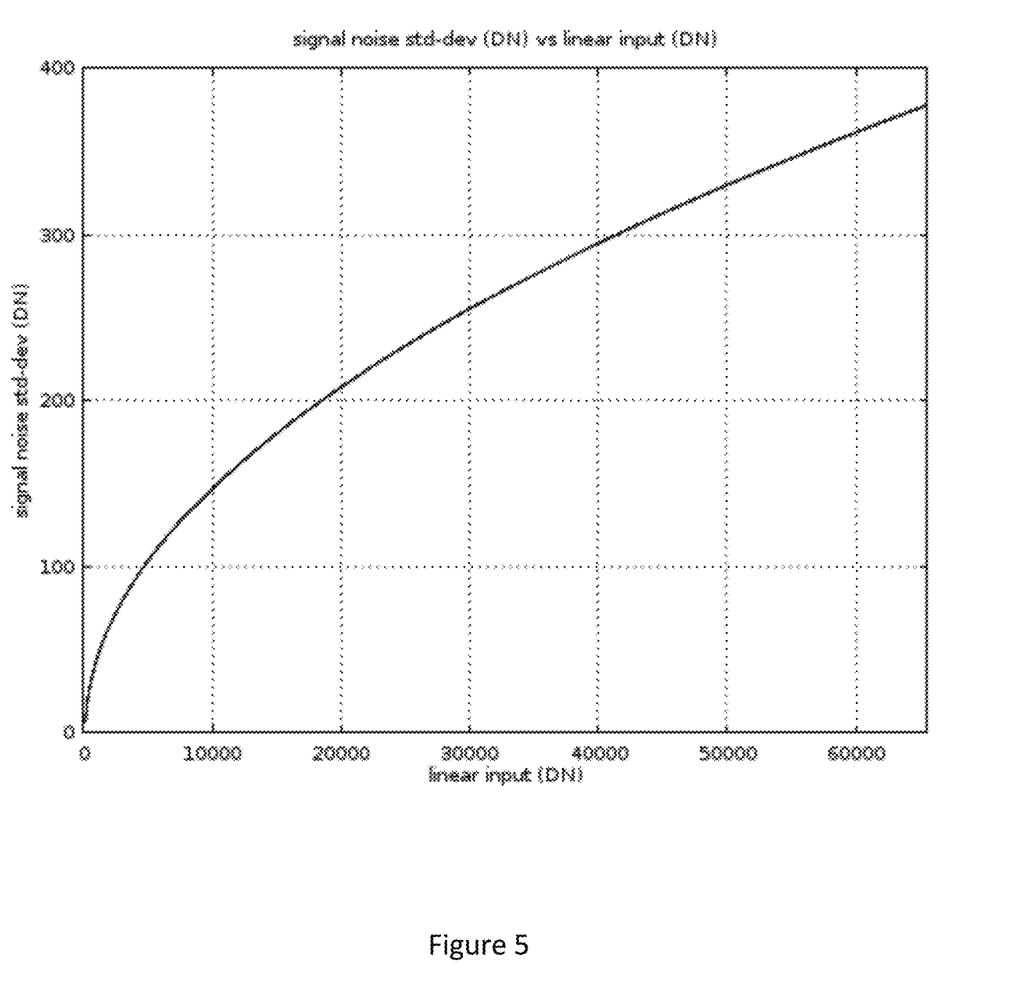
FIG. 5 is an example plot of total noise versus generated electrons converted into DN in both axes.

As shown in FIG. 5, the representation of total noise versus generated electrons can be converted to DN in both axes.

For an input DN value, conversion back to the originating electron count is input_e=(input_DN−$dn\_off$)/A_cf.

For inputs that, through subjection to noise, have a value lower than dn_min, the noise is modelled as being just the read-noise.

This is equivalent to clamping the input electrons to non-negative values, namely input_e=max{0,(input_DN−$dn\_off$)}/A_cf.

The associated total noise is thus modelled as noise_e = $sqrt$(s_r^2 + input_e) =

$sqrt$(s_r^2 + max{0, (input_DN − dn_off)} / A_cf).

The noise can be re-expressed in the digital domain as noise_DN = A_cf ∗ noise_e =

A_cf ∗ $sqrt$(s_r^2 + max{0, (input_DN − dn_off)} / A_cf).

Figure 6:
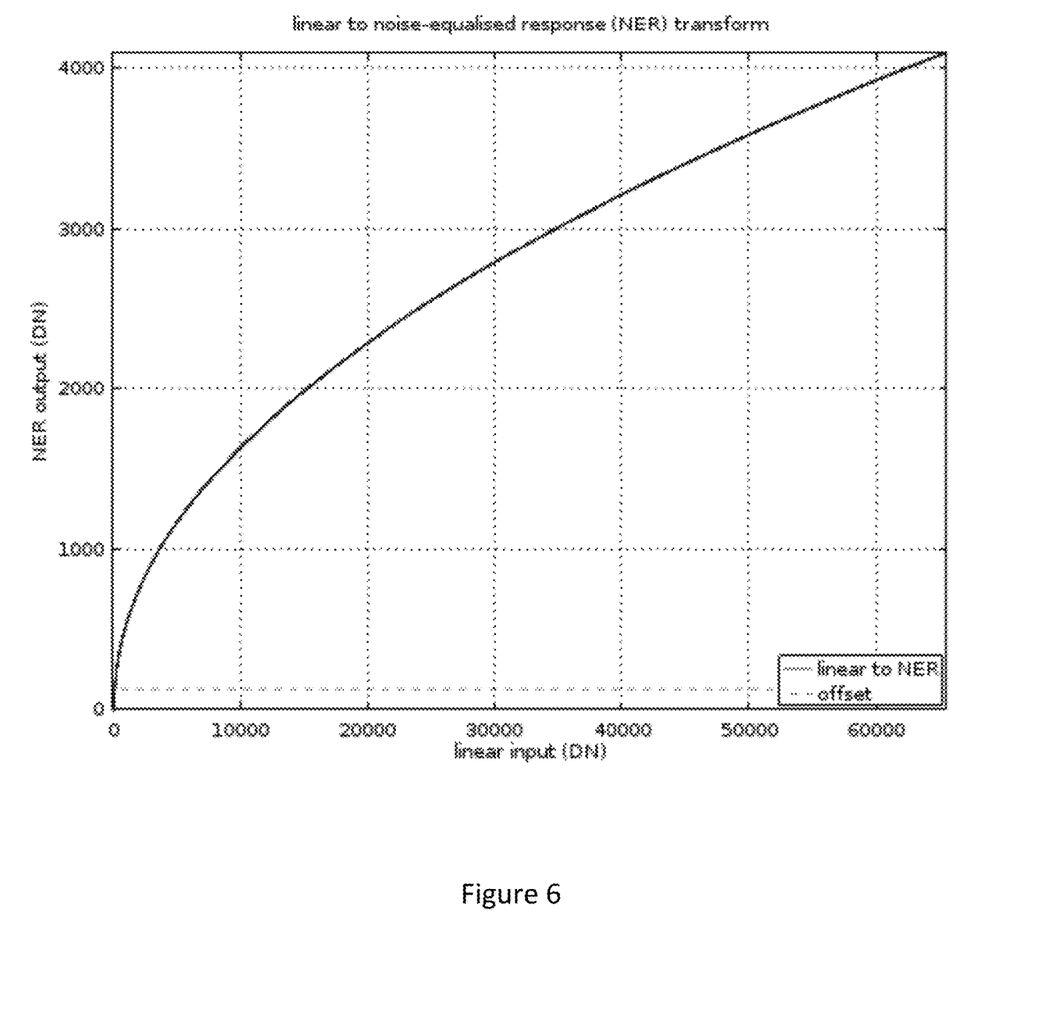
FIG. 6 is an example transform that converts a linear signal into a noise equalized response (NER) such that the plot of FIG. 5 is a flat line.

It is convenient to derive a transform that converts the linear signal into the noise equalized response (NER) so that the plot of FIG. 5 becomes a flat line, with a substantially constant noise standard deviation across the entire signal range. An example of such a transform is shown in FIG. 6.

The noise of such a non-linearly mapped resultant signal, y=f(x), where x is the linear input DN signal, is computed as the product of the linear signal's noise and the gradient function dy/dx=f'(x).

As such, the mapping must satisfy:

dy/dx∗noise_DN(x)=c1(constant); and dy/dx=c1/(A_cf∗sqrt(s_r^2+max{0,(x−dn_off)}/A_cf)).

For x>=dn_off, this is solved as:

$$y = \int \frac{c_1}{A_{CF} \cdot \sqrt{s_r^2 + (x - dn_{off})/A_{CF}}} dx = 2c_1 \cdot \sqrt{s_r^2 + (x - dn_{off})/A_{CF}} + c_2.$$

For x<dn_off, this is solved as:

$$y = \int \frac{c_1}{A_{CF} \cdot s_r} dx = \frac{c_1}{A_{CF} \cdot s_r} \cdot x + c_3.$$

As such, so long as the 'c' constants are chosen in such a way as to ensure smooth continuity between the two sub-ranges, a constant signal noise response results across the signal input range.

A non-zero pedestal is also used in the transformed signal to ensure a reasonable number of STD-deviations of dark noise are not clamped, namely:

bps—the DN bits per sample of the output NER signal;
offset—a non-zero offset (pedestal) used for the NER signal;
b—a fractional offset,
Let b=offset/$2^{bpp-1}$.

The transform from linear signal to NER signal is defined as:

$$y(x) = \begin{cases} (2^{bps} - 1)((1 - b)(x - dn_{off})/A_{CF}/(2s_r)/(s_{max} - s_r) + b) \\ \text{where } x < dn_{off} \\ (2^{bps} - 1)\left((1-b)\left(\sqrt{(x - dn_{off})/A_{CF} + s_r^2} - s_r\right)/(s_{max} - s_r) + b\right) \\ \text{where } x \geq dn_{off} \end{cases}$$

with further clamping to ensure y is non-negative everywhere, for which the constant noise STD-deviation value (DN) is everywhere (except where clamped)

noise_DN_NER = dy / dx ∗ noise_DN(x) = (2^bps − 1)(1 − b) / 2 / (s_max − s_r), (constant).

Frequency-Domain Noise Characterization

Figure 7:
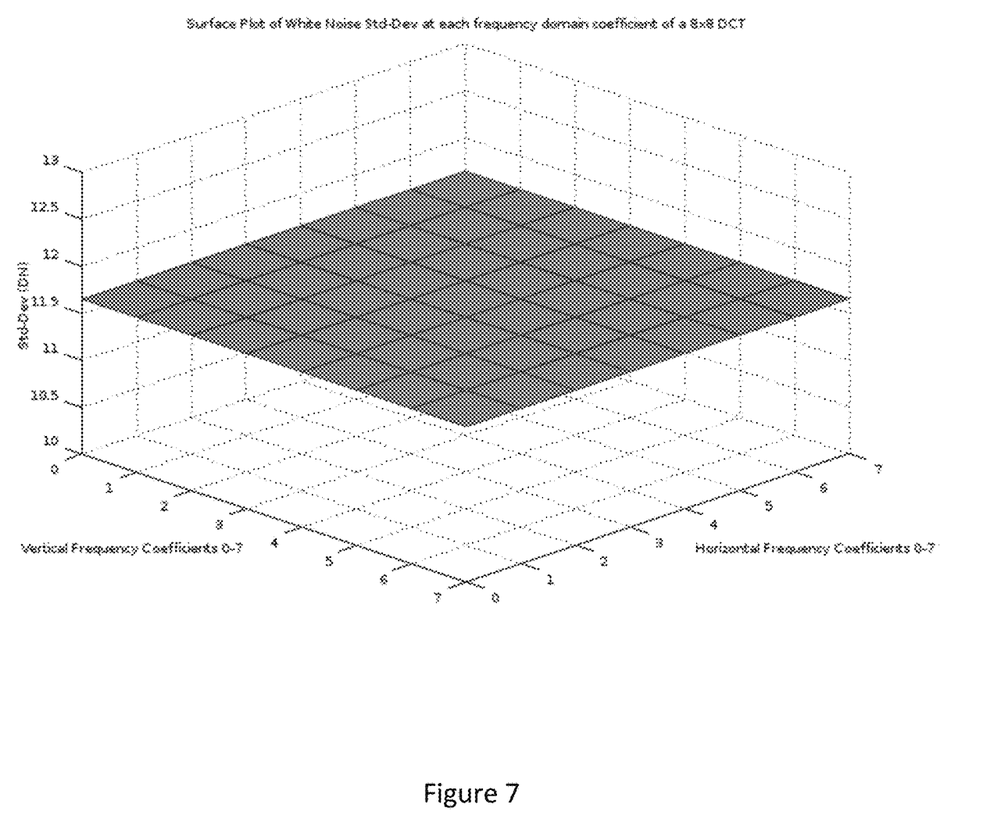
FIG. 7 is an example surface plot of a certain white noise standard deviation at each frequency domain coefficient of an 8×8 DCT.

If no pre-compression image processing is performed, the NER image is modelled as having a spatial noise distribution of white noise. This is illustrated in FIG. 7.

If compression were to completely remove (quantize/round) all noise in such a DCT 'block', the reproduced noise applied (step 140) during the decompression step (prior to the Inverse DCT operation), would have a similar profile (though only applied at the AC coefficients having zero value).

Figure 8:
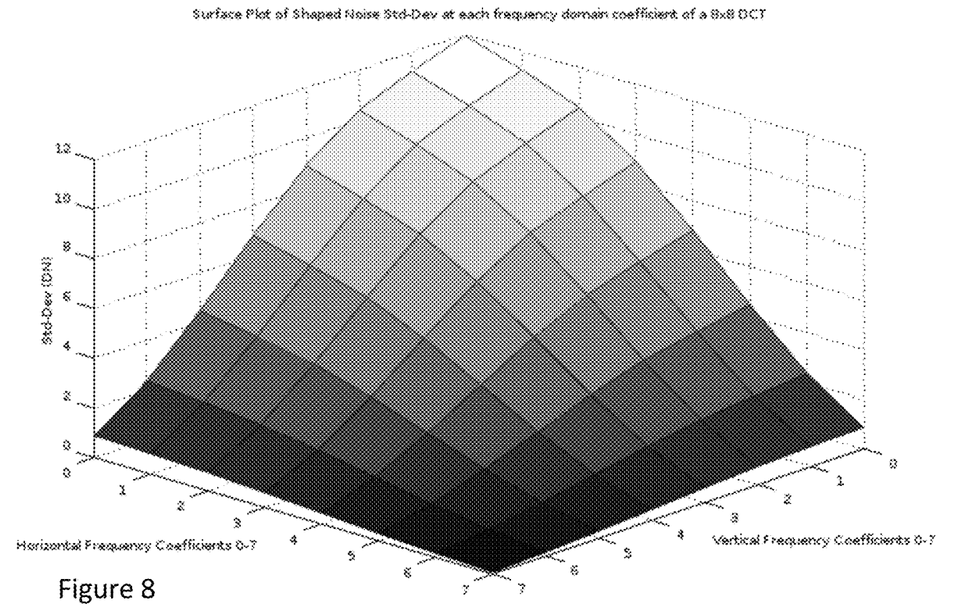
FIGS. 8 and 9 are example surface plots of certain shaped noise standard deviations at each frequency domain coefficient of an 8×8 DCT.
Figure 9:
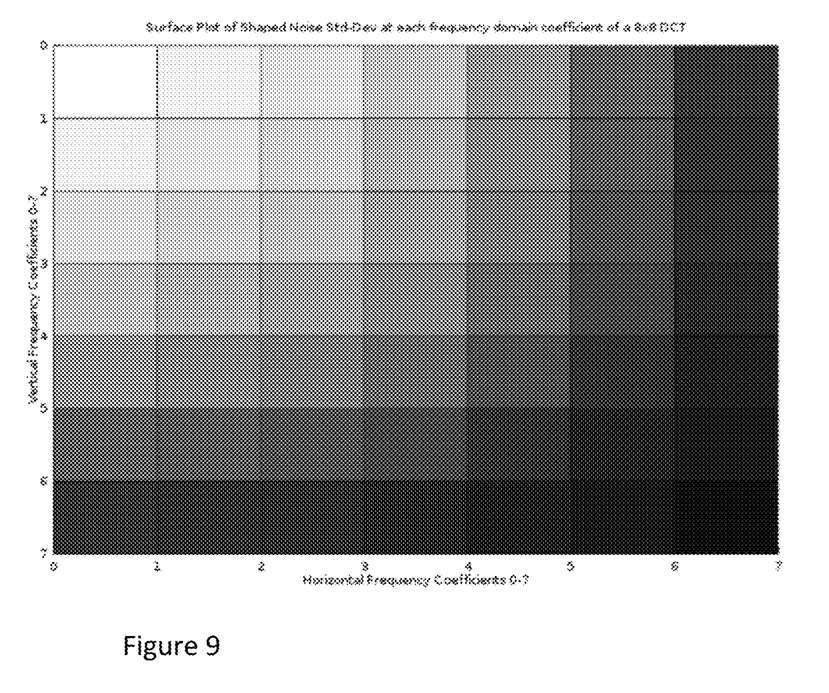

If pre-compression image processing is performed, and includes spatial filtering operations that are not band-pass (typically low-pass in practice), the spatial covariances created as a result lead to a non-white noise distribution that presents in the frequency domain as non-uniform noise level across the different DCT frequency coefficients.

This is illustrated in FIGS. 8 and 9 through consideration of an 8×8 DCT, but any other size frequency decomposition should behave similarly.

If compression were to completely remove (quantize/round) all noise in such a DCT 'block', and the desire is to recreate the shaped noise profile (i.e., rather than white-noise), then the reproduced noise applied (step 140) during the decompression process (prior to the Inverse DCT operation), would have a similar profile (though only applied at the AC coefficients having zero value). Noise injected data would not have the same STD-deviation for all frequency coefficients.

It will be understood that the disclosure in this specification extends to all alternative combinations of two or more of the individual features mentioned or evident from the text or drawings. All of these different combinations constitute various alternative aspects of the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of processing video data, said video data comprising a sequence of image frames, each image frame comprising image data represented in a frequency domain, said image data comprising one or more sets of frequency domain coefficients, and each set of frequency domain coefficients comprising a DC coefficient and one or more AC coefficients, the method including:
for each image frame of the video data, modifying one or more AC coefficients in one or more of the sets of frequency domain coefficients having a value of zero, by applying a noise signal to the zero-valued AC coefficients of the image data to yield noise-applied image data for playback of said video data.

2. The method according to claim 1, wherein the modifying comprises replacing one or more of the zero-valued AC coefficients with random or pseudo random numbers having a distribution.

3. The method according to claim 2, wherein the random or pseudo random numbers are generated using a seed value.

4. The method according to claim 2, wherein the modifying includes replacing all AC coefficients having a zero value with a corresponding noise signal.

5. The method according to claim 1, further including the step of applying an inverse quantization to the image data prior to the step of applying the noise signal to the zero-valued AC coefficients of the image data.

6. The method according to claim 5, further including the step of applying an inverse transform after the step of applying the noise signal to the zero-valued AC coefficients of the image data.

7. The method according to claim 5, further including the step of entropy-decoding the image data prior to the step of applying the inverse quantization.

8. The method according to claim 2, wherein a noise signal applied to the image data is generated as random numbers or pseudo random numbers having a distribution, said random or pseudo random numbers being scaled by reference to a predetermined noise model.

9. A method for processing an image signal obtained from an image sensor, the image signal having a noise component with an amplitude and an image component with an amplitude, the method including:
determining a conversion function from characteristics of the image sensor; and
applying the conversion function to the image signal to yield a signal with a noise component of substantially constant amplitude independent of the amplitude of the image component.

10. The method according to claim 9, further including the step of recording details of the conversion function in association with the image signal.

11. The method according to claim 9, further including the step of converting the image signal into a frequency domain representation.

12. The method according to claim 11, wherein the step of converting comprises applying a discrete cosine transform to the image signal.

13. The method according to claim 11, further including the step of quantizing the converted image signal.

14. The method according to claim 13, further including the step of entropy encoding the quantized image signal.

15. A method of decoding video data for playback, said video data comprising a sequence of image frames, each image frame comprising quantized image data represented in a frequency domain, said method comprising:
applying a noise signal to the image data to yield noise-applied image data; and
decoding said noise-applied image data to enable playback of the video data, wherein at playback, image frames include noise that is perceptually similar to noise that was present in image frames prior to encoding.

16. The method according to claim 15, wherein the noise signal is comprised of random or pseudo random numbers generated with a predetermined distribution corresponding to a noise model of the image data.

17. The method according to claim 16, wherein the predetermined distribution is based on a noise distribution that was present in the frequency domain image data prior to quantization.

18. The method according to claim 16, wherein applying a noise signal includes replacing one or more AC coefficients in the image data.

19. The method according to claim 18, wherein applying the noise signal includes replacing zero-valued image data with a corresponding noise signal.

20. The method according to claim 16, wherein the random or pseudo random numbers are generated using a seed value.

21. The method according to claim 15, further comprising applying an inverse quantization to the image data prior to the step of applying the noise signal to the image data.

22. The method according to claim 21, further comprising entropy-decoding the image data prior to the step of applying the inverse quantization.

23. The method according to claim 15, further comprising applying an inverse discrete cosine transform to the noise-applied image data.

24. The method according to claim 15, wherein the noise signal applied to the image data is generated as random numbers or pseudo random numbers having a distribution, said numbers being scaled by reference to a predetermined noise model.

25. An image processing device configured to decode video data for playback, said video data comprising a sequence of image frames, each image frame comprising quantized image data represented in a frequency domain, said quantized image data comprising one or more sets of coefficients arising from application of a mathematical transform, each set of coefficients comprising a DC coefficient and one or more AC coefficients, the image processing device being configured to:
apply a noise signal to the quantized image data to yield noise-applied image data;
decode said noise-applied image data, wherein the noise signal is selected such that decoding said noise-applied image data regenerates noise in said image frames that is perceptually similar to noise that was present in the image data prior to quantization.

26. The image processing device according to claim 25, wherein the image processing device is further configured, for each image frame of the video data, to:
replace one or more of said AC coefficients with random or pseudo random numbers generated according to a distribution.

27. The image processing device according to claim 26, wherein said noise signal is a random or pseudo random number generated with a predetermined distribution corresponding to a noise model of the image data.

\* \* \* \* \*